United States Patent
Krijger et al.

(10) Patent No.: US 12,271,738 B2
(45) Date of Patent: Apr. 8, 2025

(54) COMPUTING SYSTEM WITH REBOOT TRACKING

(71) Applicant: Microsoft Technology Licensing, LLC, Redmond, WA (US)

(72) Inventors: Hans Gerard Leonhard Krijger, Redmond, WA (US); Vishnu Bhasker, Seattle, WA (US); Abhay Sudhir Ketkar, Redmond, WA (US); Sathyanarayana Singh, Renton, WA (US); Artsiom Skliar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 18/066,247

(22) Filed: Dec. 14, 2022

(65) Prior Publication Data

US 2024/0202006 A1 Jun. 20, 2024

(51) Int. Cl.
*G06F 9/4401* (2018.01)
*G06F 11/14* (2006.01)
*G06F 11/30* (2006.01)

(52) U.S. Cl.
CPC .......... *G06F 9/4403* (2013.01); *G06F 9/4411* (2013.01); *G06F 11/1417* (2013.01); *G06F 11/3055* (2013.01); *G06F 2211/1097* (2013.01)

(58) Field of Classification Search
CPC .... G06F 9/4401; G06F 9/4403; G06F 9/4411; G06F 11/1417; G06F 11/3055; G06F 21/575; G06F 2211/1097
See application file for complete search history.

(56) References Cited

U.S. PATENT DOCUMENTS

| | | | | |
|---|---|---|---|---|
| 8,462,961 B1* | 6/2013 | Bywaters | ............... | H04R 27/00 709/227 |
| 8,924,306 B2* | 12/2014 | Borghetti | .............. | G06F 9/4416 705/55 |
| 11,494,217 B1* | 11/2022 | Krasilnikov | .......... | G06F 9/4416 |
| 2014/0108775 A1* | 4/2014 | Kludy | ..................... | H04L 67/01 713/2 |
| 2020/0310825 A1* | 10/2020 | Zhan | ..................... | G06F 9/5061 |

* cited by examiner

*Primary Examiner* — Thomas J. Cleary
(74) *Attorney, Agent, or Firm* — Alleman Hall & Tuttle LLP

(57) ABSTRACT

A computing system is provided, including a processor and memory executing a reboot tracking module configured to read out a stored reboot request identifier assigned to a node in the computing system including a first value, and receive a first reboot request to reboot the node in the computing system including a first reboot request identifier. The reboot tracking module is further configured to, responsive to identifying a match between a value of the first reboot request identifier and the first value of the stored reboot request identifier, accept the first reboot request and update the stored reboot request identifier with a second value, receive a second reboot request to reboot the node including a second reboot request identifier, and responsive to identifying a mismatch between a value of the second reboot request identifier and the second value of the stored reboot request identifier, reject the second reboot request.

18 Claims, 9 Drawing Sheets

Reboot not pending; RRIDs match; Request accepted

Request accepted; Reboot initiated

Reboot pending; Subsequent request denied

Detecting reboot is successful

Detecting reboot is unsuccessful

COMPUTING SYSTEM WITH REBOOT TRACKING

BACKGROUND

Modern distributed computing systems provide a plurality of computing devices that communicate with one another across computer networks. Such distributed computing systems may offer a variety of services that enable clients to develop and deploy applications in the cloud. A distributed computing system may include hosts of compute nodes that make virtualized compute and/or storage resources available to clients. Aspects of host and/or node management may also be accessible by clients of various privileges, such as host/node creation, deletion, movement, and reboot. Reboot may be performed under select conditions in view of maximizing uptime, however. Further, while a mechanism for consistently handling reboots in a distributed computing system may be desired, the differing privileges and types of clients that may request reboot may pose challenges to implementing such a mechanism.

SUMMARY

A computing system is provided, including a processor and memory executing a reboot tracking module configured to read out a stored reboot request identifier assigned to a node in the computing system including a first value, and receive a first reboot request to reboot the node in the computing system including a first reboot request identifier. The reboot tracking module is further configured to, responsive to identifying a match between a value of the first reboot request identifier and the first value of the stored reboot request identifier, accept the first reboot request and update the stored reboot request identifier with a second value, receive a second reboot request to reboot the node including a second reboot request identifier, and responsive to identifying a mismatch between a value of the second reboot request identifier and the second value of the stored reboot request identifier, reject the second reboot request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Modern distributed computing systems provide a plurality of computing devices that communicate with one another across computer networks. Such distributed computing systems may offer a variety of services that enable clients to develop and deploy applications in the cloud. A distributed computing system may include computing devices that provide a hardware platform hosting compute nodes that make virtualized compute and/or storge resources available to clients. Aspects of host and/or node management may also be accessible by clients of various privileges, such as host/node creation, deletion, movement, and reboot. As uptime may be prioritized in a distributed computing system, however, reboot may be limited to select conditions. Further, while a mechanism for consistently handling reboots may be desired, differing privileges and types of clients that may request reboot may pose challenges to implementing such a mechanism. For end users engaging a distributed computing system through a customer-facing interface, equivalence in reboot may be appropriate—for example, requests to reboot a host/node from two end users in a similar timeframe may be considered fulfilled and reboot successful if a single reboot occurs at the host/node. In contrast, clients below the customer-facing level, such as an automated fabric repair service configured to address degradation in host/node operation, may wish to independently track different reboot requests to obtain more thorough diagnostic information. Without a mechanism to track reboots, redundant reboots may be performed, reducing host/node uptime and potentially affecting client workloads.

Figure 1:
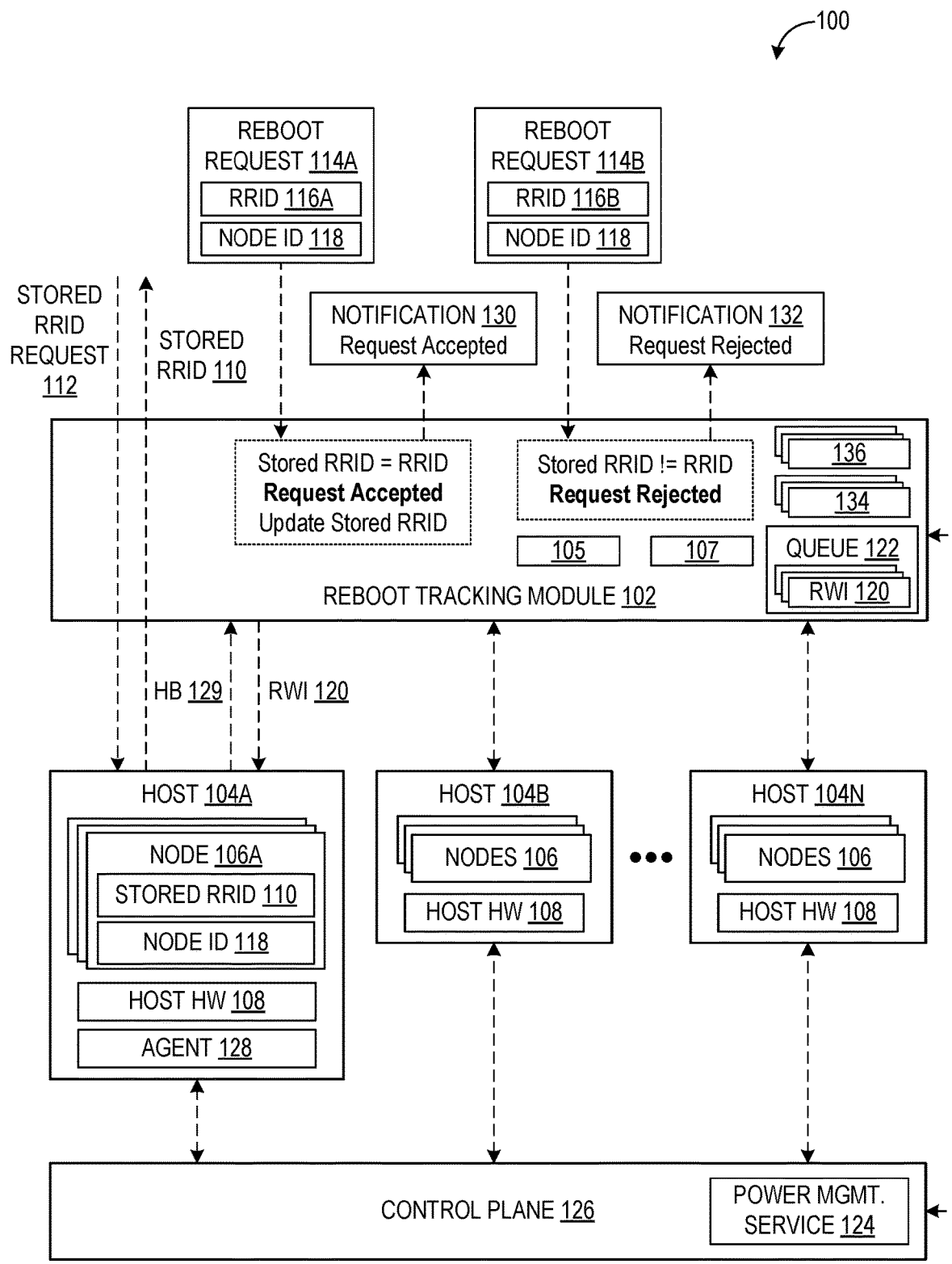
FIG. 1 shows an example computing system including a reboot tracking module.

To address these challenges, FIG. 1 provides a computing system 100 including a reboot tracking module 102 with which different requests to perform reboots in the computing system, and the outcomes corresponding to those requests, may be tracked. Computing system 100 includes a plurality of host computing devices 104, or hosts, that host one or more compute nodes 106. Hosts 104 provide a hardware platform via host hardware 108 on which compute nodes 106 are hosted. A host 104 may be a physical computing device such as a blade server, as one example. In some implementations, one or more hosts 104 may be configured as a dedicated host that is reserved for a particular client. Hosts 104 and nodes 106 may communicate with one another and with reboot tracking service 102 via one or more computer networks. Further, reboot tracking module 102 includes a processor 105 and memory 107 to implement the functionality described herein.

Figure 2:
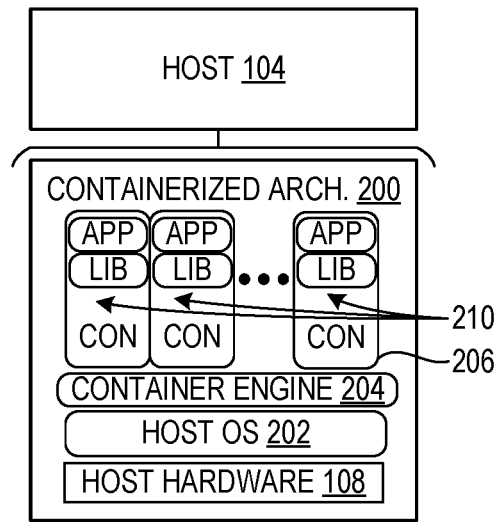
FIG. 2 shows an example containerized computing device architecture.

Nodes 106 may provide virtualized compute and/or storage resources to clients. In some examples, virtualized compute/storage resources may be provided through virtual machines executing on nodes 106. Virtual machines may be implemented using a containerized architecture or a hypervisor architecture, for example. FIG. 2 shows an example containerized architecture 200, in which a host operating system (OS) 202 is executed on host hardware 108 (e.g., processor, accelerator hardware, non-volatile storage memory, and volatile memory), along with an instance of a container engine 204. Container engine 204 provides a software interface between host OS 202 and one or more containers 206. Each container 206 includes respective application programs, libraries, binaries, and other data used by the applications. In this way, each container 206 implements a containerized virtual machine 210 within the container.

Figure 3:
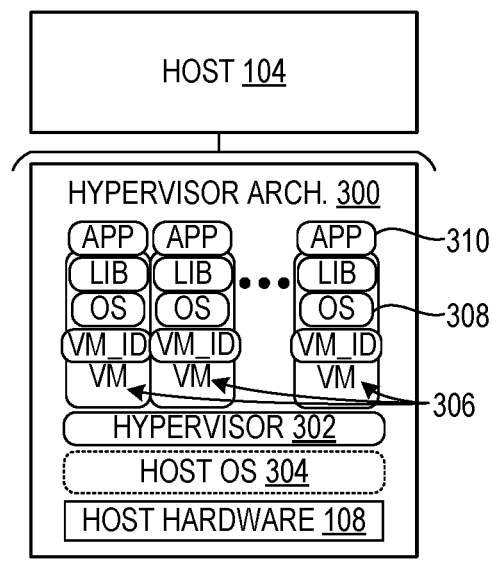
FIG. 3 shows an example hypervisor computing device architecture.

FIG. 3 shows an example hypervisor architecture 300 including a hypervisor 302 executed on a host OS 304, which in turn is executed on host hardware 108. Hypervisor 302 provides a software interface between host OS 304 and external hypervisor control plane servers, as well as individual virtual machines 306. Each virtual machine 306 includes a guest OS instance 308, as well as libraries, binaries, and other data used by applications 310 executed within the hypervised virtual machine. In some implementations host OS 304 may be omitted.

Returning to FIG. 1, reboot tracking module 102 is configured to receive requests to reboot individual nodes 106, and for each reboot request and corresponding node, determine whether to accept or reject the reboot request based on various criteria. One such criterion includes comparing a stored reboot request identifier (RRID) associated with a node 106 to a reboot request identifier associated with a reboot request. As an example, FIG. 1 depicts a stored RRID 110 associated with a node 106A executing on a host 104A. Reboot tracking module 102 may be configured to initialize a corresponding stored RRID for each node 106 upon the initialization of that node, for example.

In preparing to formulate a request to reboot a node 106, a call may first be made to read out the stored RRID associated with the node. FIG. 1 depicts an ID request 112 for stored RRID 110 associated with node 106A, where the ID request is made in preparation of requesting reboot of that node. By way of reboot tracking module 102, ID request 112 is received, stored RRID 110 is read out (e.g., from memory in host hardware 108), and the stored RRID is returned to the caller issuing the request. After receiving stored RRID 110, the caller issues a reboot request 114A to reboot node 104A. Reboot request 114A includes a reboot request identifier 116A identifying the reboot request, and a node identifier 118 identifying node 106A for which reboot is requested. In this example, reboot request identifier 116A includes a value that is set to the value of stored RRID 110 as indicated in the response to ID request 112.

Reboot request 114A is received at reboot tracking module 112, which compares the value of stored RRID 110 assigned to node 106A to the value of reboot request identifier 116A in the reboot request. Module 112 identifies a match between the values, and in response, accepts reboot request 114A. Module 112 may take various actions as part of accepting reboot request 114A, such as creating a reboot work item 120 and adding the work item to a queue 122. Reboot work item 120 is configured to be executed by node 106A, and upon execution cause the node 106A to be rebooted. Queue 122 may hold work items executed by one or more nodes 106 when in a ready state—i.e., not updating, migrating, or undergoing another operation that obviates executing work items in the queue. While FIG. 1 depicts a single queue 122 that holds work items executed by different nodes 106, in other implementations, separate queues may be provided for nodes and/or hosts.

The reboot of node 106A may be effected—e.g., through the execution of reboot work item 120—in any suitable manner. For example, FIG. 1 depicts a power management service 124 implemented at a host control plane 126 that may be called to power cycle host 104A. In some examples, this call may be processed by a rack manager that power cycles host 104A in response to the call. FIG. 1 also depicts an agent 128 implemented at host 104A that may be called to soft reboot host 104A. Module 112 may invoke respective API calls to effect reboot via service 124 or agent 128, for example. Further, in some implementations nodes 106 may be configured to emit a heartbeat signal 129 detectable by reboot tracking module 102 while nodes are operational—i.e., not undergoing reboot. Module 102 may detect the presence or absence a heartbeat signal 129 to inform whether a node 106 has resumed operation after a reboot.

Reboot tracking module 112 may take other actions upon accepting reboot request 114A. FIG. 1 depicts the output of a notification 130 (e.g., to the caller issuing reboot request 114A) indicating that the reboot request was accepted. As described below, module 112 may determine whether an accepted reboot request was fulfilled and the corresponding node was successfully rebooted, and output notifications indicating reboot success or failure. Upon accepting reboot request 114A, module 112 further updates the original value of stored RRID 110 assigned to node 106A with a new value different from the original value. In this way, module 112 may reject future requests to reboot node 106A that have reboot request identifiers whose values do not match the value of stored RRID 110.

FIG. 1 illustrates a second reboot request 114B having a reboot request identifier 116B and a node identifier 118 addressing the request to node 106A. As discussed above with respect to reboot request 114A, reboot request 114B may be preceded by reading out stored RRID 110 at node 106A. As, in this example, the value of stored RRID 110 is read out prior to updating its value—where the update is made in response to accepting reboot request 114A—the value returned is the original value of stored RRID 110 prior to its update. The value of reboot request identifier 116B included in reboot request 114B is thus set to the original value of stored RRID 110. When reboot request 114B is processed by reboot tracking module 112, a mismatch is identified between the value of reboot request identifier 116B and the updated value of stored RRID 110. Accordingly, module 112 rejects reboot request 114B and outputs a notification 132 (e.g., to the caller issuing reboot request 114B) indicating that reboot request 114B is rejected. In some examples, the updated value of stored RRID 110 may be returned to the caller that issued reboot request 114B. This may enable the caller to track the status and outcome of the reboot of node 106A, resulting from the acceptance of reboot request 114A, for which the value stored RRID 110 was updated. By tracking the reboot in this way, the caller whose reboot request 114B was rejected may avoid issuing redundant reboot requests for node 106A.

In addition to stored RRIDs, reboot tracking module 102 may track other values that form a tracked reboot state 134 representing the state of reboot at a corresponding node 106. Module 102 may similarly track values that form a host/node state 136 representing the state of a host 104/node 106. Module 102 may update such values at various points in handling a reboot request 114, where updates may affect whether future reboot requests for a node 106 are accepted or rejected. Module 102 may further interpret such values to determine whether a reboot of the node resulting from an accepted request is successful or unsuccessful.

FIGS. 4A-4F depict various examples illustrating how values relating to the state of reboot at a node 106 and/or the state of a node 104 may be updated in response to various events and interpreted to inform knowledge of reboot outcome. In these examples, such values are tracked in a tracked reboot state that indicates the reboot state of a corresponding node 106.

Figure 4A:
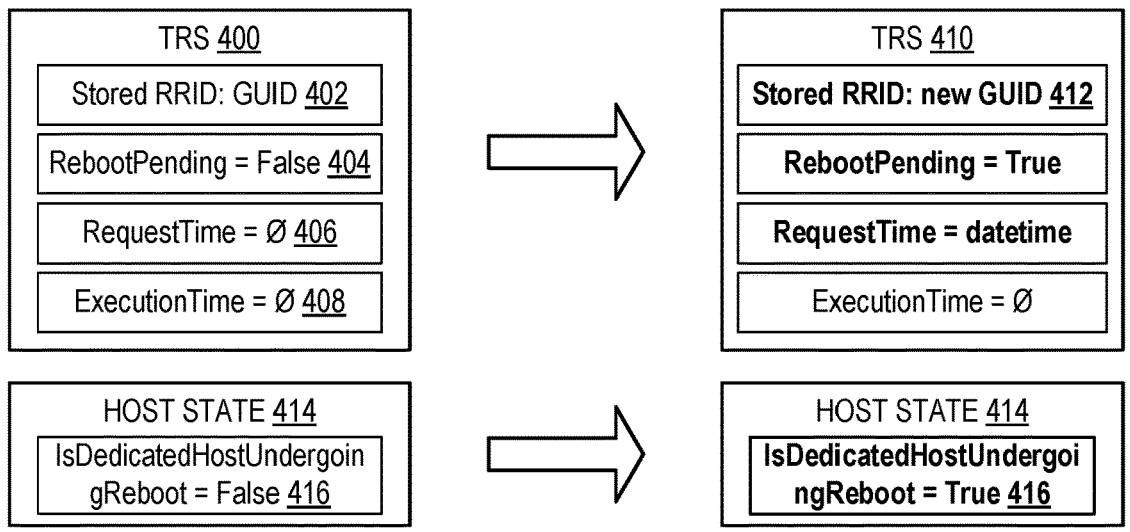
FIGS. 4A-4F show various example tracked reboot states.

With reference to FIG. 4A, a tracked reboot state 400 includes a stored RRID 402 (e.g., RRID 110) assigned to a node 106. As shown in this example, stored RRID 402 may include a globally unique identifier (GUID) value assigned to node 106. Where GUID values are used, a unique GUID may be assigned to each node 106 at a host 104, or to each node 106 across computing system 100. In this way, a unique reboot state for each node 106 may be tracked. Reboot state 400 further includes a reboot pending value 404 indicating whether reboot of the node is pending, a reboot request time value 406 indicating a time at which reboot of the node is requested, and a reboot execution time value 480 indicating a time at which the node is rebooted.

The depicted values of tracked reboot state 400 may represent the initial values with which tracked reboot states (e.g., states 134) are instantiated for each node 106 upon node initialization. The initial values include a stored RRID 402 having an initial GUID value, reboot pending value 404 having an initial value of false (as reboot of the node has not yet been initiated), and request time value 406 and execution time value 408 having null or empty values (as reboot has not yet been requested or initiated).

FIG. 4A also depicts an updated tracked reboot state 410 representing the reboot state of the corresponding node after a request to reboot the node has been accepted. Here, the value of stored RRID 402 is updated with a new value (e.g., new GUID value) 412, reboot pending value 404 is updated from false to true (as the reboot request has been accepted and node reboot is now pending), and request time value 406 is updated with a value corresponding to the time at which the reboot request is accepted (e.g., as registered by reboot tracking module 102 upon accepting the request).

FIG. 4A further depicts data that may be tracked regarding the state of a host 104 on which node 106 is hosted. In this example, a host state 414 (e.g. host state 136) for host 104 is tracked and includes a host reboot pending value 416 indicating whether the host and/or one or nodes 106 thereon is currently undergoing reboot. After accepting the request to reboot node 106, the initial value of host reboot pending value 416—false—is updated to true to indicate that reboot of the host/hosted node(s) is pending. As described in further detail below, the disclosed techniques for handling reboots may include assessments of host state, which may affect whether actions are permitted that affect host state.

Figure 4B:
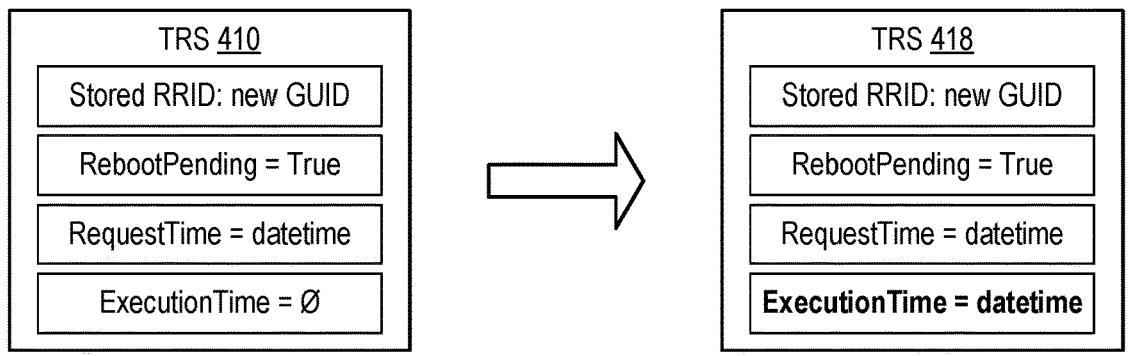

FIG. 4B illustrates the update of tracked reboot state 410 in response to the initiation of reboot at a corresponding node 106. Here, reboot execution time value 408 is updated with a value corresponding to the time at which the reboot of node 106 is initiated (e.g., as registered by reboot tracking module 102 upon the node executing a reboot work item 120 created after accepting a request to reboot the node), forming an updated tracked reboot state 418.

Figure 4C:
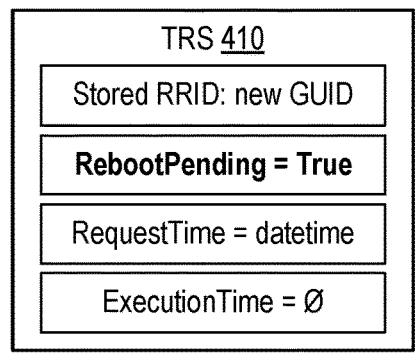

FIG. 4C illustrates another condition that may prompt the rejection of a reboot request, in addition to identifying a mismatch between a stored RRID and a reboot request identifier included in a reboot request. With reference to tracked reboot state 410—reflecting the reboot state of a corresponding node 106 after accepting a request to reboot the node—its reboot pending value 404 is set to true, indicating reboot of the node is pending. As such, when a new reboot request for the node 106 is received—i.e., a reboot request following an earlier reboot request whose acceptance resulted in setting reboot pending value 404 to true—the new reboot request may be rejected as reboot of the node is already pending. Due to this reboot pending status, the new reboot request may be rejected even though its reboot request identifier matches the stored RRID assigned to the node. As this new reboot request is rejected, no update to the values in tracked reboot state 410 is performed. In view of the above, in some implementations reboot tracking module 102 may accept a reboot request directed to a node 106 if (1) the reboot request identifier included in the request matches the stored RRID assigned to the node, and (2) the node is not currently undergoing reboot (e.g., as indicated by a reboot pending value in a tracked reboot state for the node). Further, in some implementations, reboot tracking module 102 may reject a reboot request directed to a node 106 if a mismatch is identified between the reboot request identifier and stored RRID, even if the node is not currently undergoing reboot.

Figure 4D:
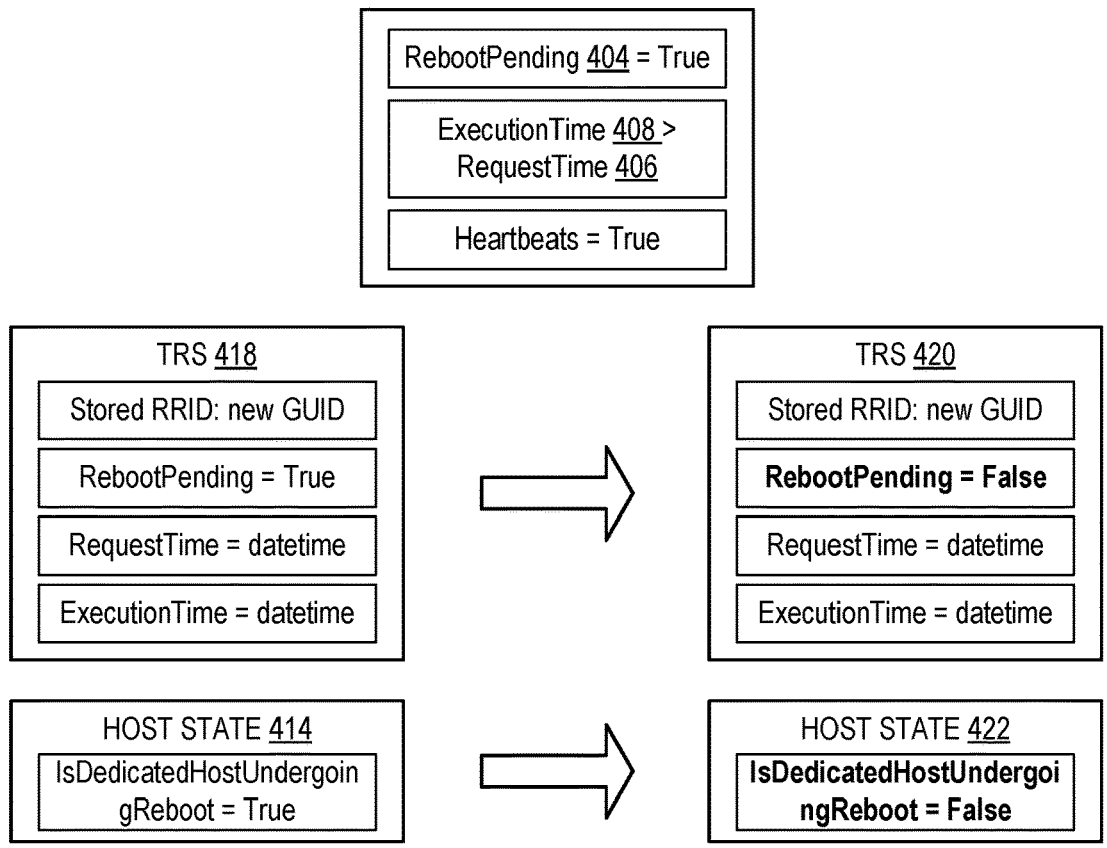

FIG. 4D illustrates an example in which the successful reboot of a node 106 is detected. In this example, values of tracked reboot state 418—i.e., the tracked reboot state of the node after initiating reboot—are assessed to determine whether reboot of the node succeeded or failed. Here, reboot pending value 404 indicates that reboot of the node is pending, and reboot request time 406 and reboot execution time 408 are compared to identify that the time at which reboot of the node was executed is greater than the time at which reboot of the node was requested. FIG. 4D also depicts the detection of a heartbeat signal (e.g., signal 129) from the node, indicating that the node has successfully resumed operation after being rebooted. As such, reboot of the node is deemed to have occurred successfully. As a result of the successful reboot, tracked reboot state 418 is updated with its reboot pending value being updated to false, forming an updated tracked reboot state 420. Host state 414 may be further updated with its host reboot pending value being changed to indicate that the host 104 and/or nodes 106 thereon is/are not undergoing reboot, forming updated host state 422.

Figure 4E:
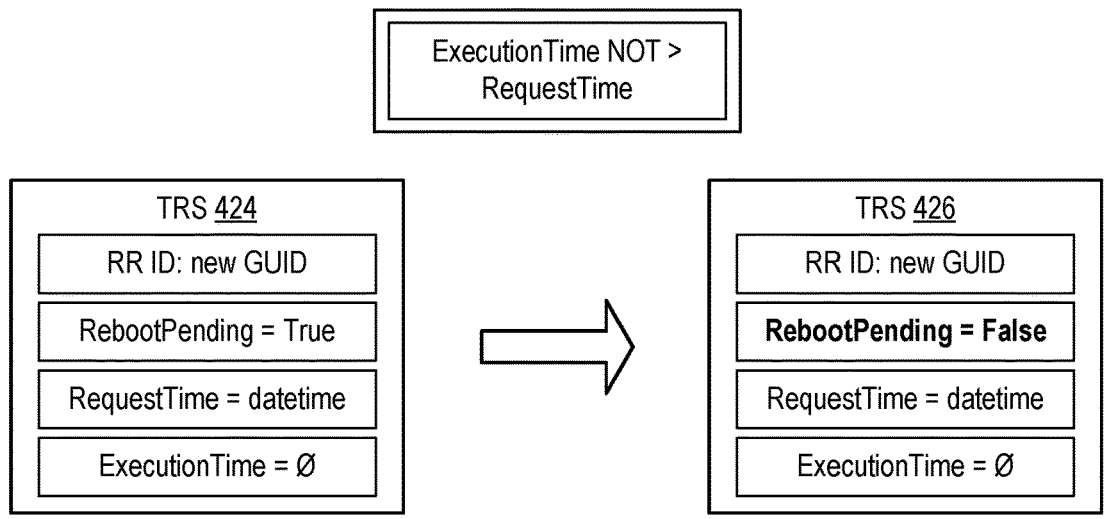

FIG. 4E illustrates an example in which the unsuccessful reboot of a node 106 is detected. Here, the values of reboot request time 406 and reboot execution time 408 are compared to identify that the reboot execution time is not greater than the reboot request time, indicating that reboot did not complete successfully. In this example, the reboot pending value of a tracked reboot state 424 is updated from true to false, which, in combination with the reboot execution time not being greater than the reboot request time, may be interpreted as an indication of unsuccessful reboot.

Figure 4F:
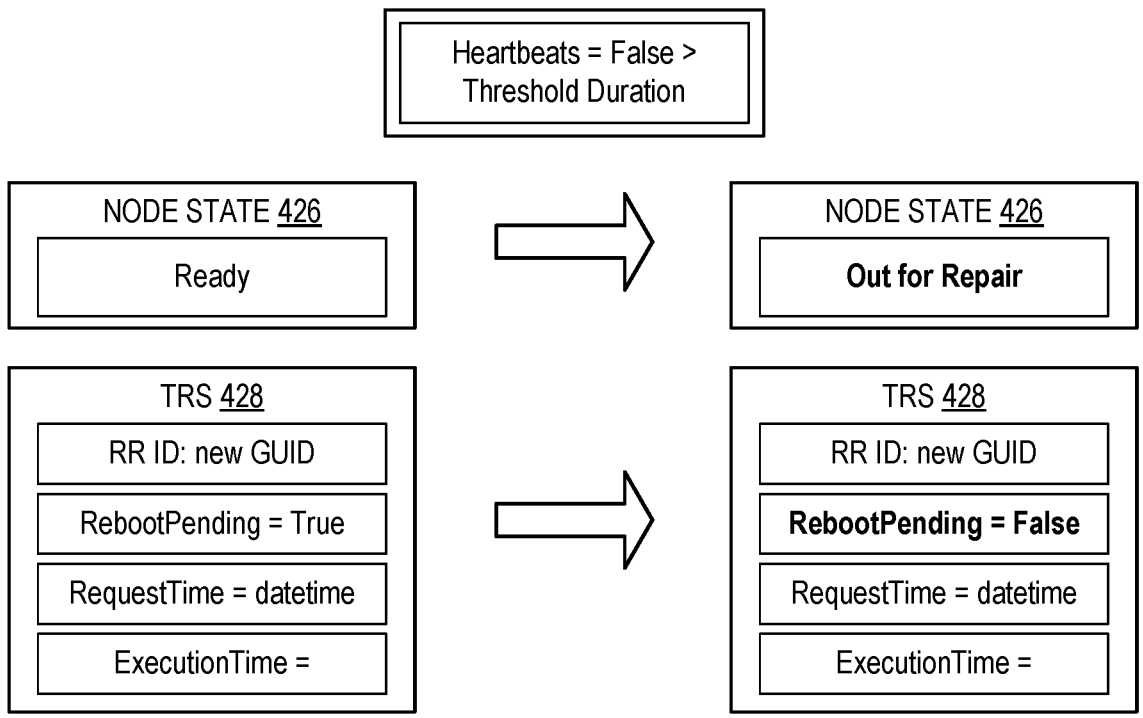

FIG. 4F illustrates an example in which the unsuccessful reboot of a node 106 is detected. Here, an absence of a heartbeat signal from the node 106 is detected for a duration greater than a threshold duration, indicating that the node did not resume operation after initiating reboot. As noted above, reboot tracking module 102 may track respective states of hosts 104 and/or nodes 106 in computing system 100. In the example of FIG. 4F, a node state 426 representing the state of node 106 is updated, from a ready value, to an out-for-repair value in response to the absence of the heartbeat signal. Further, a tracked reboot state 428 for the node 106 is updated with its reboot pending value being updated from true to false. Other conditions may prompt node state 426 to be updated from a ready to out-for-repair, such as detecting that the reboot pending value of tracked reboot state 428 remains true for a duration greater than a threshold duration.

Figure 5:
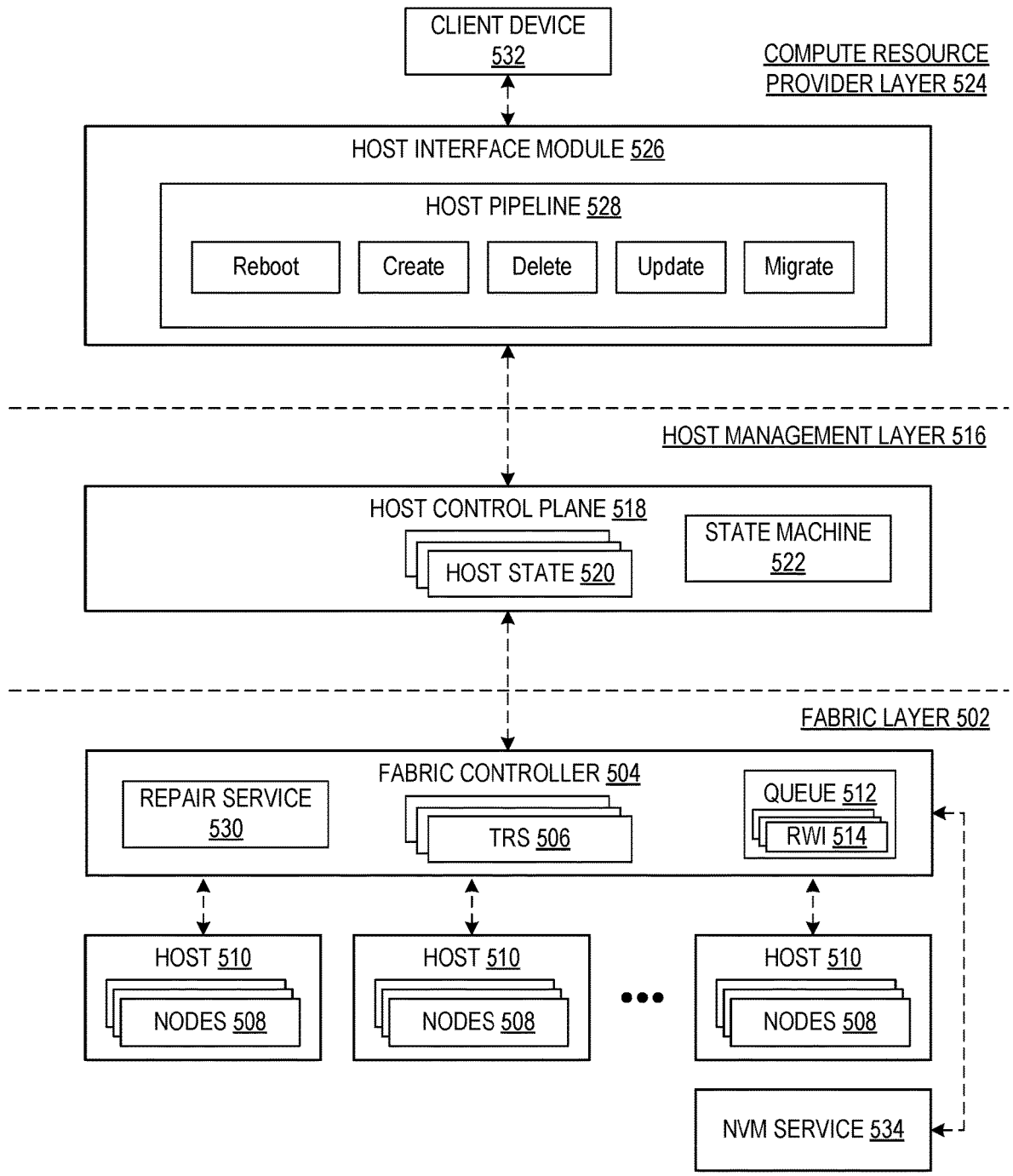
FIG. 5 shows an example architecture with which the computing system of FIG. 1 may be implemented.

FIG. 5 depicts an example architecture 500 with which aspects of reboot tracking module 102 may be implemented. In this example, reboot tracking functions are distributed across multiple layers implementing respective modules for handling various parts of a reboot pipeline. The depicted modules may thus implement aspects of reboot tracking module 102. Architecture 500 includes a fabric layer 502 implementing a fabric controller 504 configured to maintain a respective tracked reboot state 506 for each node 508 executing on a corresponding host 510. Tracked reboot states 506 may include a stored RRID associated with a corresponding node 508, and values relating to whether reboot is pending at the node, the time at which reboot is requested, and the time at which reboot is executed. Fabric controller 504 further implements a queue 512 including reboot work items 514 that, when executed, are configured to cause reboot of a node 508.

Architecture 500 further includes a host management layer 516 implementing a host control plane 518 configured to manage aspects of hosts 510 and pass messages to other layers. Control plane 518 is configured to maintain a respective host state 520 for each host 510. Further, control plane 518 includes a state machine 522 configured to accept or reject a request to change a state of a host 510 based on information indicated in a corresponding host state 520, such as whether the host and/or one or more nodes hosted thereon is undergoing reboot. For example, state machine 522 may reject a request to perform an update operation or a migrate operation (e.g., moving a host to another computing device) at a host 510 if the host is being deleted. State machine 522 may further accept a request to perform a host operation if a host 510 is migrating but may reject a request to migrate a host if the host is undergoing reboot. Yet further, state machine 522 may prioritize and accept a request to delete a host 510 even if the host is being rebooted.

In response to a request to reboot a node 508 on a host 510, control plane 518 may perform various determinations to accept/reject the request—e.g., at the host level. Upon accepting the request, control plane 518 may relay the request to fabric controller 504, and update a state of the host—at a corresponding host state 520—to indicate the host is undergoing reboot. Upon a notification from fabric controller 504 indicating that a reboot pending value in a tracked reboot state 506 of a node 508 has changed to false, the state of a corresponding host 510 may be updated to indicate the host is no longer undergoing reboot. Evaluations of host/node state at control plane 518 may further include assessing an operational status of a host/node. For example, a reboot request may be rejected if a node 508 is assigned an out-for-repair status. In view of the above, architecture 500 may implement host-level determinations of whether to accept or reject a reboot request and/or node-level determinations of whether to accept or reject a reboot request.

Architecture 500 further includes a compute resource provider layer 524 implementing a host interface module 526 configured to receive requests relating to reboot of nodes 508 and to operations regarding hosts 510, and to output notifications to callers issuing such requests. Interface module 526 implements a host pipeline 528 configured to process host/node requests, including but not limited to requests to reboot, create, delete, update, and/or migrate a host/node.

Requests to reboot a node 508 may be issued in various manners in architecture 500. For example, FIG. 5 depicts a fabric repair service 530 implemented at fabric controller 504 configured to repair nodes 508 that have an out-for-repair status. As another example, FIG. 5 shows a client device 532 in communication with host interface module 526, where the client device may be used to issue reboot requests and receive notifications regarding reboot requests. In some implementations, interface module 526 may provide a client portal (e.g., via client-facing APIs) with which clients may issue requests regarding host/node operations.

In some examples, host interface module 526 may be configured to determine whether a requested reboot of a node 508 was successful or unsuccessful. In such examples, fabric controller 504 may report information regarding the state of nodes 508—e.g., by passing tracked reboot states 506 to layers 516 and/or 524. Interface module 526 may then interpret a tracked reboot state 506, and/or other information such as an operational status, to determine whether reboot was successful. As one example, interface module 526 may determine a reboot to be unsuccessful in response to reading an operational status of a node 508 being out-for-repair, as reported to the interface module from layers 516 and/or 502.

Messages may be passed among layers in architecture 500 in any suitable manner. In some examples, a notification may be sent from layer 502 to layer 516 upon a change in one or more values of a tracked reboot state 506 for a node 508, such as a change in reboot pending, request time, and/or execution time values. Alternatively or additionally, layer 524 may poll layer 516 (e.g., at regular intervals) for information regarding host states 520 by calling into control plane 518. Further, layer 517 may poll layer 502 for information regarding tracked reboot states 506 by calling into fabric controller 504. Layer 502 may further pass to layers 516 and/or 524 a stored RRID assigned to a node 508, such as in response to a stored RRID request in preparation of requesting reboot of the node, and/or in response to a stored RRID request for tracking the status of a reboot.

In some examples, fabric controller 504 may store tracked reboot states 506 in non-volatile memory via a non-volatile memory service 534. In such examples, in the event of degradation at fabric layer 502, tracked reboot states 506 may be retrieved from service 534. Further, implementations are possible in which host management layer 516 is omitted. In such examples, reboot requests for nodes 508 may be communicated from layer 524 to layer 502, with notifications regarding reboot/node state being passed from layer 502 to layer 524.

Figure 6A:
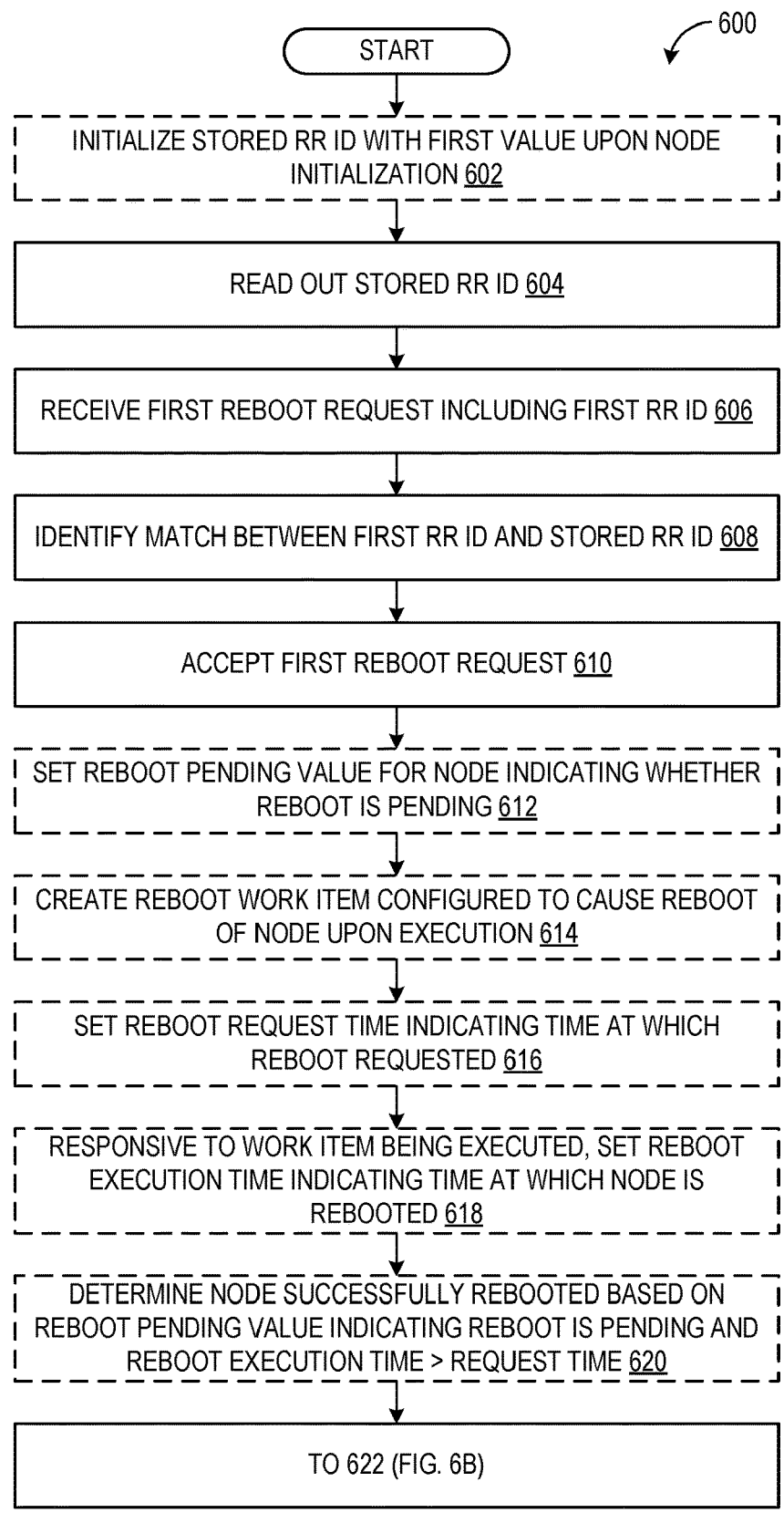
FIGS. 6A-6B show a flowchart illustrating an example method for processing reboot requests.
Figure 6B:
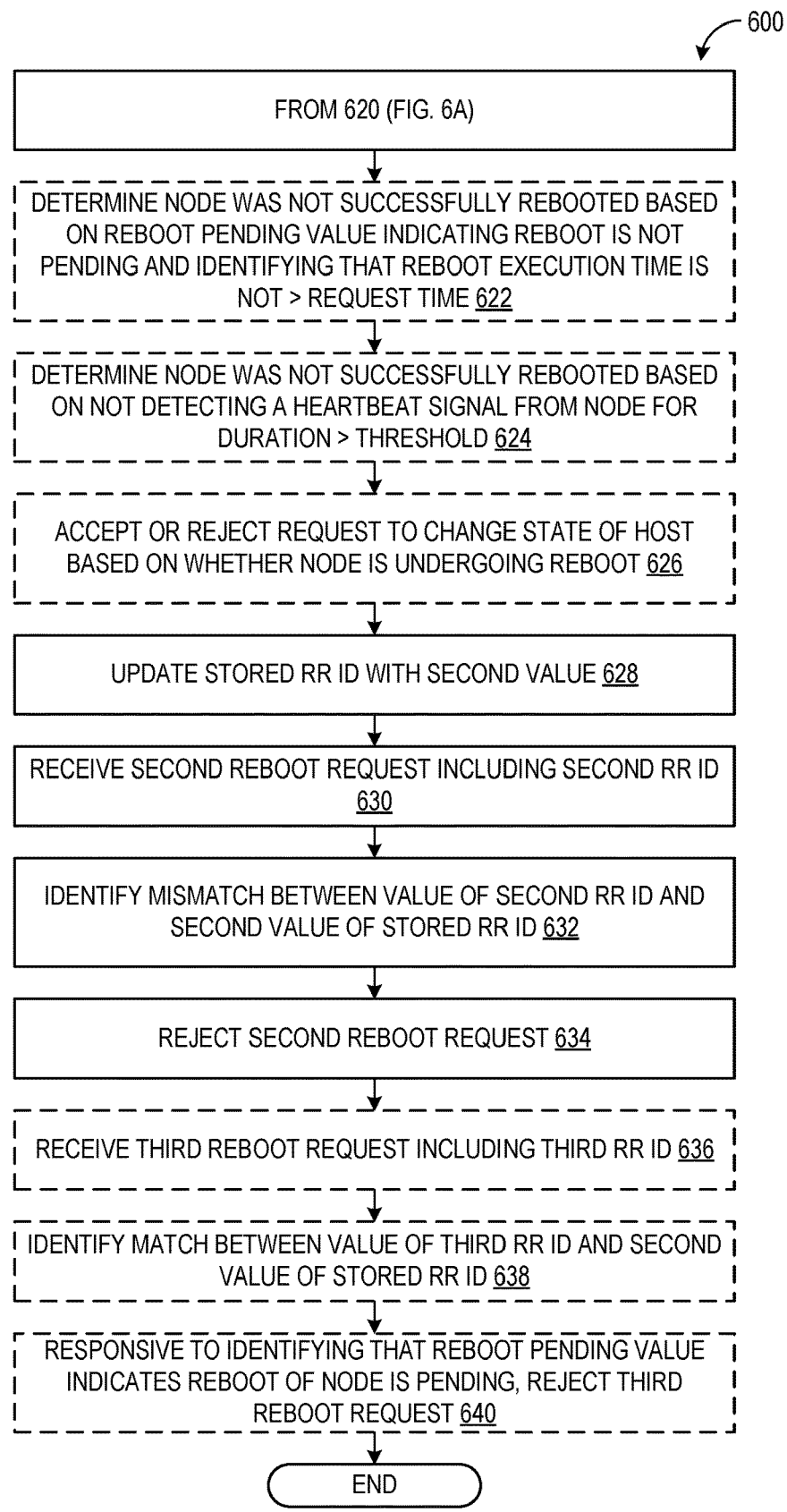

FIGS. 6A-6B depict a flowchart illustrating an example method 600. Method 600 may be implemented at reboot tracking module 102.

At 602, method 600 includes optionally initializing a stored reboot request identifier (RRID) with a first value upon initialization of a node in a computing system. The stored RRID may be assigned to the node, and in some examples may include a GUID value. At 604, method 600 includes reading out the stored reboot request identifier assigned to the node in the computing system, the stored reboot request identifier including a first value. At 606, method 600 includes receiving a first reboot request to reboot the node in the computing system, the first reboot request including a first reboot request identifier identifying the first reboot request.

At 608, method 600 includes identifying a match between a value of the first reboot request identifier and the first value of the stored reboot request identifier. At 610, method 600 includes accepting the first reboot request. At 612, method 600 optionally includes, upon accepting the first reboot request, setting a reboot pending value for the node indicating whether reboot of the node is pending. At 614, method 600 optionally includes, responsive to accepting the first reboot request, creating a reboot work item configured to cause reboot of the node upon execution of the reboot work item. At 616, method 600 optionally includes setting a reboot request time indicating a time at which reboot of the node is requested.

At 618, method 600 optionally includes, responsive to the reboot work item being executed at the node, setting a reboot execution time value indicating a time at which the node is rebooted. At 620, method 600 optionally includes determining that the node was successfully rebooted based on the reboot pending value indicating that reboot of the node is pending, and also based on identifying that the reboot execution time is greater than the reboot request time. At 622, method 600 optionally includes determining that the node was not rebooted successfully based on the reboot pending value indicating that reboot of the node is not pending, and also based on identifying that the reboot execution time is not greater than the reboot request time.

At 624, method 600 optionally includes, after accepting the first reboot request, detecting that the first reboot request was not fulfilled and the node was not successfully rebooted based at least on not detecting a heartbeat signal from the node for a duration greater than a threshold duration. At 626, method 600 optionally includes accepting or rejecting a request to change a state of a host of the computing system, on which the node is hosted, based on whether the node is undergoing reboot.

At 628, method 600 includes updating the stored reboot request identifier assigned to the node with a second value. At 630, method 600 includes receiving a second reboot request to reboot the node, the second reboot request including a second reboot request identifier identifying the second reboot request. At 632, method 600 includes identifying a mismatch between a value of the second reboot request identifier and the second value of the stored reboot request identifier. At 634, method 600 includes rejecting the second reboot request.

At 636, method 600 optionally includes receiving a third reboot request to reboot the node, the third reboot request including a third reboot request identifier identifying the third reboot request. At 638, method 600 optionally includes identifying a match between a value of the third reboot request identifier and the second value of the stored reboot request identifier. At 640, method 600 optionally includes, responsive to identifying that the reboot pending value indicates that reboot of the node is pending, rejecting the third reboot request.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
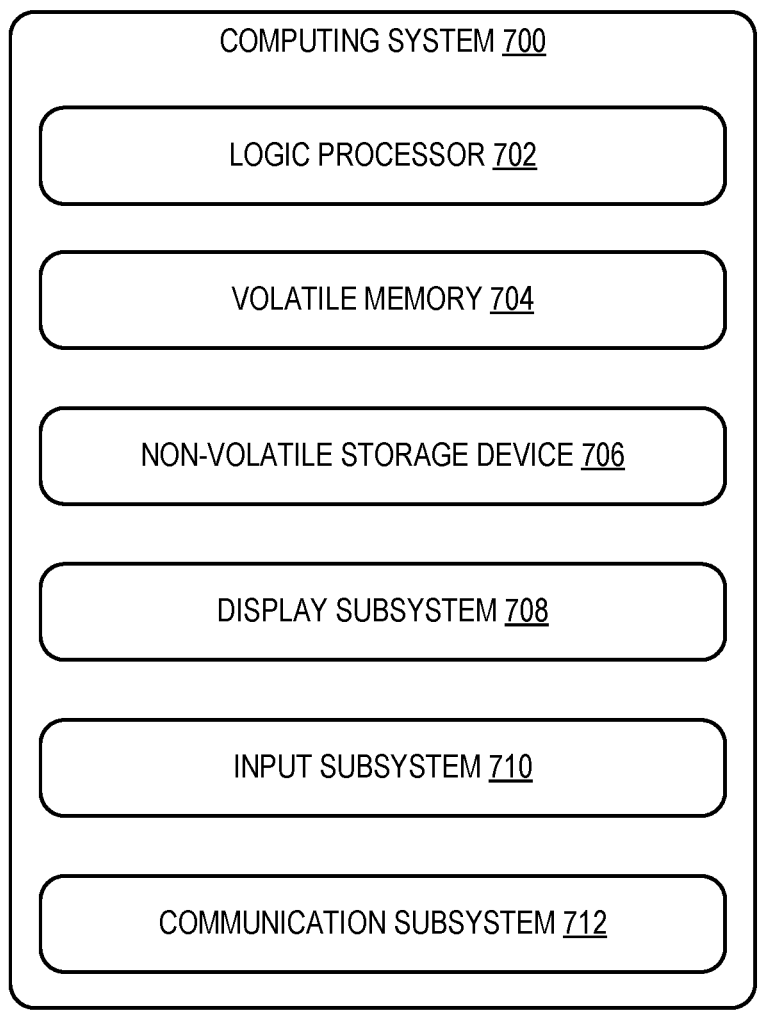
FIG. 7 shows a block diagram of an example computing system that may be used to implement the computing system of FIG. 1.

FIG. 7 schematically shows a non-limiting embodiment of a computing system 700 that can enact one or more of the methods and processes described above. Computing system 700 is shown in simplified form. Computing system 700 may embody reboot tracking module 102 and/or host 104 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

Another example provides a computing system, comprising a processor and memory storing instructions that cause the processor to execute a reboot tracking module configured to read out a stored reboot request identifier assigned to a node in the computing system, the stored reboot request identifier including a first value, receive a first reboot request to reboot the node in the computing system, the first reboot request including a first reboot request identifier identifying the first reboot request, responsive to identifying a match between a value of the first reboot request identifier and the first value of the stored reboot request identifier, accept the first reboot request and update the stored reboot request identifier assigned to the node with a second value; receive a second reboot request to reboot the node, the second reboot request including a second reboot request identifier identifying the second reboot request, and responsive to identifying a mismatch between a value of the second reboot request identifier and the second value of the stored reboot request identifier, reject the second reboot request. In such an example, the reboot tracking module may be further configured to initialize the stored reboot request identifier with the first value upon initialization of the node. In such an example, the reboot tracking module alternatively or additionally may be configured to, upon accepting the first reboot request, set a reboot pending value for the node indicating whether reboot of the node is pending. In such an example, the reboot tracking module alternatively or additionally may be configured to, responsive to accepting the first reboot request, create a reboot work item configured to cause reboot of the node upon execution of the reboot work item, and set a reboot request time indicating a time at which reboot of the node is requested, and, responsive to the reboot work item being executed at the node, set a reboot execution time value indicating a time at which the node is rebooted. In such an example, the reboot tracking module alternatively or additionally may be configured to determine that the node was successfully rebooted based on the reboot pending value indicating that reboot of the node is pending, and also based on identifying that the reboot execution time is greater than the reboot request time. In such an example, the reboot tracking module alternatively or additionally may be configured to determine that the node was not rebooted successfully based on the reboot pending value indicating that reboot of the node is not pending, and also based on identifying that the reboot execution time is not greater than the reboot request time. In such an example, the reboot tracking module alternatively or additionally may be configured to receive a third reboot request to reboot the node, the third reboot request including a third reboot request identifier identifying the third reboot request, identify a match between a value of the third reboot request identifier and the second value of the stored reboot request identifier, and responsive to identifying that the reboot pending value indicates that reboot of the node is pending, reject the third reboot request. In such an example, the reboot tracking module alternatively or additionally may be configured to, after accepting the first reboot request, determine that the first reboot request was not fulfilled and the node was not successfully rebooted based at least on not detecting a heartbeat signal from the node for a duration greater than a threshold duration. In such an example, the node may be hosted on a host of the computing system, and the reboot tracking module alternatively or additionally may be configured to accept or reject a request to change a state of the host based on whether the node is undergoing reboot.

Another example provides a method implemented at a computing system, the method comprising reading out a stored reboot request identifier assigned to a node in the computing system, the stored reboot request identifier including a first value, receiving a first reboot request to reboot the node in the computing system, the first reboot request including a first reboot request identifier identifying the first reboot request, responsive to identifying a match between a value of the first reboot request identifier and the first value of the stored reboot request identifier, accepting the first reboot request and updating the stored reboot request identifier assigned to the node with a second value, receiving a second reboot request to reboot the node, the second reboot request including a second reboot request identifier identifying the second reboot request, and responsive to identifying a mismatch between a value of the second reboot request identifier and the second value of the stored reboot request identifier, rejecting the second reboot request. In such an example, the method may further comprise initializing the stored reboot request identifier with the first value upon initialization of the node. In such an example, the method alternatively or additionally may comprise, upon accepting the first reboot request, setting a reboot pending value for the node indicating whether reboot of the node is pending. In such an example, the method alternatively or additionally may comprise, responsive to accepting the first reboot request, creating a reboot work item configured to cause reboot of the node upon execution of the reboot work item, and setting a reboot request time indicating a time at which reboot of the node is requested, and responsive to the reboot work item being executed at the node, setting a reboot execution time value indicating a time at which the node is rebooted. In such an example, the method alternatively or additionally may comprise determining that the node was successfully rebooted based on the reboot pending value indicating that reboot of the node is pending, and also based on identifying that the reboot execution time is greater than the reboot request time. In such an example, the method alternatively or additionally may comprise determining that the node was not rebooted successfully based on the reboot pending value indicating that reboot of the node is not pending, and also based on identifying that the reboot execution time is not greater than the reboot request time. In such an example, the method alternatively or additionally may comprise receiving a third reboot request to reboot the node, the third reboot request including a third reboot request identifier identifying the third reboot request, identifying a match between a value of the third reboot request identifier and the second value of the stored reboot request identifier, and responsive to identifying that the reboot pending value indicates that reboot of the node is pending, rejecting the third reboot request. In such an example, the method alternatively or additionally may comprise, after accepting the first reboot request, detecting that the first reboot request was not fulfilled and the node was not successfully rebooted based at least on not detecting a heartbeat signal from the node for a duration greater than a threshold duration. In such an example, the node may be hosted on a host of the computing system, and the method alternatively or additionally may comprise accepting or rejecting a request to change a state of the host based on whether the node is undergoing reboot.

Another example provides a computing system, comprising a processor and memory storing instructions that cause the processor to execute a fabric layer configured to initialize a tracked reboot state for a node in the computing system, the node being associated with a host in the computing system, the tracked reboot state including a stored reboot request identifier assigned to the node, read out the stored reboot request identifier assigned to the node, receive a reboot request to reboot the node in the computing system, the reboot request including a reboot request identifier identifying the reboot request, based at least on comparing the stored reboot request identifier assigned to the node with the reboot request identifier associated with the reboot request, determining whether to accept or reject the reboot request at a node level, and responsive to the reboot request being accepted at the node level and at a host level, add a reboot work item to a queue associated with the node, the reboot work item being configured to cause reboot of the node upon execution of the reboot work item, the queue including work items to be executed when the node is in a ready state, and assign a new reboot request identifier to the node, a host management layer configured to, based at least on the tracked reboot state, determine a state of the host, and based at least on the state of the host, determine whether to accept or reject the reboot request at the host level, a compute resource provider (CRP) layer configured to, based at least on the tracked reboot state, determine whether the reboot request was fulfilled and the node was successfully rebooted, and output a notification indicating whether the node was successfully rebooted. In such an example, the tracked reboot state may further include a reboot request time indicating a time at which reboot of the node is requested, a reboot execution time indicating a time at which the node is rebooted, and a reboot pending value indicating whether reboot of the node is pending, and the compute resource provider alternatively or additionally may be configured to determine whether the node was successfully rebooted based on one or more of the reboot request time, the reboot execution time, and the reboot pending value.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a processor configured to:
read out a stored reboot request identifier assigned to a node in the computing system, the stored reboot request identifier including a first value;
receive a first reboot request to reboot the node in the computing system, the first reboot request including a first reboot request identifier identifying the first reboot request;
responsive to identifying a match between a value of the first reboot request identifier and the first value of the stored reboot request identifier, accept the first reboot request and update the stored reboot request identifier assigned to the node with a second value;
receive a second reboot request to reboot the node, the second reboot request including a second reboot request identifier identifying the second reboot request; and
responsive to identifying a mismatch between a value of the second reboot request identifier and the second value of the stored reboot request identifier, reject the second reboot request, wherein:
the node is hosted on a host of the computing system; and
the processor is further configured to accept or reject a request to change a state of the host based on whether the node is undergoing reboot.

2. The computing system of claim 1, wherein the processor is further configured to initialize the stored reboot request identifier with the first value upon initialization of the node.

3. The computing system of claim 1, wherein the processor is further configured to, upon accepting the first reboot request, set a reboot pending value for the node indicating whether reboot of the node is pending.

4. The computing system of claim 3, wherein the processor is further configured to:
responsive to accepting the first reboot request, create a reboot work item configured to cause reboot of the node upon execution of the reboot work item, and set a reboot request time indicating a time at which reboot of the node is requested; and responsive to the reboot work item being executed at the node, set a reboot execution time value indicating a time at which the node is rebooted.

5. The computing system of claim 4, wherein the processor is further configured to determine that the node was successfully rebooted based on the reboot pending value indicating that reboot of the node is pending, and also based on identifying that the reboot execution time is greater than the reboot request time.

6. The computing system of claim 4, wherein the processor is further configured to determine that the node was not rebooted successfully based on the reboot pending value indicating that reboot of the node is not pending, and also based on identifying that the reboot execution time is not greater than the reboot request time.

7. The computing system of claim 3, wherein the processor is further configured to:

receive a third reboot request to reboot the node, the third reboot request including a third reboot request identifier identifying the third reboot request;

identify a match between a value of the third reboot request identifier and the second value of the stored reboot request identifier; and responsive to identifying that the reboot pending value indicates that reboot of the node is pending, reject the third reboot request.

8. The computing system of claim 1, wherein the processor is further configured to, after accepting the first reboot request, determine that the first reboot request was not fulfilled and the node was not successfully rebooted based at least on not detecting a heartbeat signal from the node for a duration greater than a threshold duration.

9. A method implemented at a computing system, the method comprising:

reading out a stored reboot request identifier assigned to a node in the computing system, wherein the node is hosted on a host of the computing system, the stored reboot request identifier including a first value;

receiving a first reboot request to reboot the node in the computing system, the first reboot request including a first reboot request identifier identifying the first reboot request;

responsive to identifying a match between a value of the first reboot request identifier and the first value of the stored reboot request identifier, accepting the first reboot request and updating the stored reboot request identifier assigned to the node with a second value;

receiving a second reboot request to reboot the node, the second reboot request including a second reboot request identifier identifying the second reboot request;

responsive to identifying a mismatch between a value of the second reboot request identifier and the second value of the stored reboot request identifier, rejecting the second reboot request; and accepting or rejecting a request to change a state of the host based on whether the node is undergoing reboot.

10. The method of claim 9, further comprising initializing the stored reboot request identifier with the first value upon initialization of the node.

11. The method of claim 9, further comprising, upon accepting the first reboot request, setting a reboot pending value for the node indicating whether reboot of the node is pending.

12. The method of claim 11, further comprising:

responsive to accepting the first reboot request, creating a reboot work item configured to cause reboot of the node upon execution of the reboot work item, and setting a reboot request time indicating a time at which reboot of the node is requested; and responsive to the reboot work item being executed at the node, setting a reboot execution time value indicating a time at which the node is rebooted.

13. The method of claim 12, further comprising determining that the node was successfully rebooted based on the reboot pending value indicating that reboot of the node is pending, and also based on identifying that the reboot execution time is greater than the reboot request time.

14. The method of claim 12, further comprising determining that the node was not rebooted successfully based on the reboot pending value indicating that reboot of the node is not pending, and also based on identifying that the reboot execution time is not greater than the reboot request time.

15. The method of claim 11, further comprising:

receiving a third reboot request to reboot the node, the third reboot request including a third reboot request identifier identifying the third reboot request;

identifying a match between a value of the third reboot request identifier and the second value of the stored reboot request identifier; and responsive to identifying that the reboot pending value indicates that reboot of the node is pending, rejecting the third reboot request.

16. The method of claim 9, further comprising, after accepting the first reboot request, detecting that the first reboot request was not fulfilled and the node was not successfully rebooted based at least on not detecting a heartbeat signal from the node for a duration greater than a threshold duration.

17. A computing system, comprising:

a processor and memory storing instructions that cause the processor to execute:

a fabric layer configured to:

initialize a tracked reboot state for a node in the computing system, the node being associated with a host in the computing system, the tracked reboot state including a stored reboot request identifier assigned to the node;

read out the stored reboot request identifier assigned to the node;

receive a reboot request to reboot the node in the computing system, the reboot request including a reboot request identifier identifying the reboot request;

based at least on comparing the stored reboot request identifier assigned to the node with the reboot request identifier associated with the reboot request, determining whether to accept or reject the reboot request at a node level; and responsive to the reboot request being accepted at the node level and at a host level, add a reboot work item to a queue associated with the node, the reboot work item being configured to cause reboot of the node upon execution of the reboot work item, the queue including work items to be executed when the node is in a ready state; and assign a new reboot request identifier to the node;

a host management layer configured to:

based at least on the tracked reboot state, determine a state of the host; and based at least on the state of the host, determine whether to accept or reject the reboot request at the host level, a compute resource provider (CRP) layer configured to:
based at least on the tracked reboot state, determine whether the reboot request was fulfilled and the node was successfully rebooted; and output a notification indicating whether the node was successfully rebooted.

18. The computing system of claim 17, wherein the tracked reboot state further includes a reboot request time indicating a time at which reboot of the node is requested, a reboot execution time indicating a time at which the node is rebooted, and a reboot pending value indicating whether reboot of the node is pending, and wherein the compute resource provider layer is further configured to determine whether the node was successfully rebooted based on one or more of the reboot request time, the reboot execution time, and the reboot pending value.

* * * * *